(12) United States Patent
Horii et al.

(10) Patent No.: US 10,171,258 B2
(45) Date of Patent: Jan. 1, 2019

(54) DATA COLLECTION METHOD AND SYSTEM

(75) Inventors: Hiroshi Horii, Kanagawa (JP); Akira Koseki, Kanagawa (JP); Taiga Nakamura, Kanagawa (JP); Tamiya Onodera, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/961,592

(22) Filed: Dec. 7, 2010

(65) Prior Publication Data

US 2011/0137971 A1 Jun. 9, 2011

(30) Foreign Application Priority Data

Dec. 7, 2009 (JP) ................................. 2009-277182

(51) Int. Cl.
| | | |
|---|---|---|
| H04L 12/18 | (2006.01) | |
| H04L 1/18 | (2006.01) | |
| H04L 12/44 | (2006.01) | |
| H04L 12/753 | (2013.01) | |
| G06F 11/36 | (2006.01) | |

(52) U.S. Cl.
CPC .......... *H04L 12/1868* (2013.01); *H04L 1/189* (2013.01); *H04L 1/1887* (2013.01); *H04L 12/1854* (2013.01); *H04L 12/44* (2013.01); *H04L 45/48* (2013.01); *G06F 11/3668* (2013.01)

(58) Field of Classification Search
CPC ............. H04L 12/1868; H04L 12/1854; H04L 12/44; H04L 1/1887; H04L 1/189; H04L 45/48

USPC .................................. 709/252, 221; 370/408
See application file for complete search history.

(56) References Cited

U.S. PATENT DOCUMENTS

| | | | | |
|---|---|---|---|---|
| 6,314,464 | B1 * | 11/2001 | Murata et al. ................ | 709/226 |
| 6,505,253 | B1 * | 1/2003 | Chiu .................. | H04L 12/1868 370/229 |
| 6,917,985 | B2 * | 7/2005 | Madruga et al. ............. | 709/238 |
| 7,203,743 | B2 * | 4/2007 | Shah-Heydari .............. | 709/223 |
| 7,644,182 | B2 * | 1/2010 | Banerjee et al. ............. | 709/242 |
| 8,059,561 | B2 * | 11/2011 | Ushiyama et al. ........... | 370/254 |
| 2002/0150094 | A1 * | 10/2002 | Cheng et al. ................ | 370/389 |

(Continued)

FOREIGN PATENT DOCUMENTS

| | | |
|---|---|---|
| JP | 64-055959 A | 3/1989 |
| JP | 05076183 | 3/1993 |

(Continued)

OTHER PUBLICATIONS

Shuichi Shimizu, "Recursive Point-to-group Routing for Reliable End-host Multicast" IPSJ Journal, vol. 49 No. 3 Mar. 2008.

*Primary Examiner* — Gregory G Todd
(74) *Attorney, Agent, or Firm* — Jennifer R Davis; Otterstedt, Ellenbogen & Kammer, LLP

(57) ABSTRACT

A method of collecting data into a server from multiple client computers is provided as a first aspect of the invention. The method includes the steps of: reconstructing a collection network in a tree structure having the server acting as a highest node and the multiple client computers acting as child nodes every time the data is collected; the server broadcasting a parent-child declaration to nodes placed at the lower level; and each of the nodes transferring data to a node placed at the higher level.

14 Claims, 16 Drawing Sheets

(56) References Cited

U.S. PATENT DOCUMENTS

| | | | |
|---|---|---|---|
| 2005/0015511 A1* | 1/2005 | Izmailov et al. | 709/238 |
| 2005/0021817 A1* | 1/2005 | Shimizu et al. | 709/231 |
| 2005/0063326 A1* | 3/2005 | Ohkuma et al. | 370/310 |
| 2006/0291452 A1* | 12/2006 | Velagaleti | H04L 1/1671 370/352 |
| 2008/0040507 A1* | 2/2008 | Hsu et al. | 709/238 |
| 2008/0285945 A1* | 11/2008 | Rajakarunanayake | H04N 21/4325 386/235 |
| 2010/0302933 A1* | 12/2010 | Sreenan et al. | 370/217 |
| 2011/0137971 A1* | 6/2011 | Horii et al. | 709/201 |
| 2015/0188671 A1* | 7/2015 | Distasi | H04L 1/189 370/336 |

FOREIGN PATENT DOCUMENTS

| | | |
|---|---|---|
| JP | 2005-092653 A | 4/2005 |
| JP | 2006295813 | 10/2006 |
| JP | 2007-228064 | 6/2007 |
| JP | 2009-044661 | 2/2009 |
| JP | 2009188920 | 8/2009 |

\* cited by examiner

FULL-PUSH TYPE

FULL-PULL TYPE

TREE-PULL TYPE

DATA COLLECTION METHOD AND SYSTEM

CROSS-REFERENCE TO RELATED APPLICATION(S)

This application claims foreign priority to Japanese Patent application 2009-277182 filed 7 Dec. 2009, the complete disclosure of which is expressly incorporated herein by reference in its entirety for all purposes.

FIELD OF THE INVENTION

The present invention relates to the electrical, electronic and computer arts, and, more particularly, to data collection and the like.

BACKGROUND OF THE INVENTION

In a system (full-push type) such as a Web server and browsers, clients take the initiative in transmitting data to a server, and in a system (full-pull type) such as a page collection robot of a search engine, a server takes the initiative in collecting data from all clients. The data collected in such systems are in such small units that a high load is imposed on the server. In addition, clients at a higher level in a data collection tree, for example, are required to receive and transmit a large amount of data constantly. In this respect, when the tree structure is fixed, load is likely to be concentrated on specific clients.

For example, Japanese Patent Application Publication No. 2009-044661 discloses a technique of allowing each node to change a hierarchy level to which the node belongs to another hierarchy level in a hierarchically structured network system without accompanying discontinuance of streaming distribution from the server. Japanese Patent Application Publication No. 2009-044661 particularly discloses a technique of allowing each node to appropriately change the hierarchy level according to indexes based on buffering amounts, hardware resources and transfer rates of the node itself and upper and lower nodes being in communication with the node. However, in this technique, since a client having high capability in distributing data are placed simply at a higher level, load is always concentrated on the client having high capability. In addition to this, when a failure occurs in the client having high capability, data distribution becomes impossible. Japanese Patent Application Publication No. 2009-044661 does not suggest a solution to achieve highly reliable data collection while avoiding load concentration on a specific client in order that multiple clients can transmit data to a single server continuously and stably.

Japanese Patent Application Publication No. 2007-228064 relates to a technique for achieving reliability in application-layer multicast communication (simultaneous distribution). In this technique, each of receivers makes a notification of a reception result (ACK/NACK) of multicast data, and the data is retransmitted depending on the result. The technique is particularly characterized in that a notification of ACK/NACK and retransmission of data are performed locally between sibling nodes having the same parent node in a multicast tree. The method is assumed to be used in multicast, that is, in a case where the same data is simultaneously distributed from the server to receivers. Only when the multicast is employed, a reception confirmation and retransmission can be performed locally between the sibling nodes. However, this method cannot be applied to a situation where clients need to confirm whether a server receives data after transmitting the data to the server, Shuichi Shimizu, "Recursive Point-to-group Routing for Reliable End-host Multicast." Transactions of Information Processing Society of Japan, Vol. 49. No. 3, March 2008 is a paper related to a Peer to Group (P2G).

SUMMARY OF THE INVENTION

Principles of the invention provide techniques for a data collection method and system. In one aspect, one or more embodiments aim to enable continuous and stable data transmission from multiple clients to a server, and provide a method and a system therefor. In addition, one or more embodiments also aim to provide a highly reliable data collection method and system which impose only small load on the server while avoiding load concentration on a specific client for stable data transmission.

In order to address one or more issues, one or more embodiments provide a method of collecting data into a server from a plurality of client computers each having a storage unit, the method including the steps of: reconstructing a collection network in a tree structure at predetermined time intervals, the collection network having the server acting as a highest node and the plurality of client computers acting as child nodes every time the data is collected: the server broadcasting a parent-child declaration to the child nodes on the basis of the collection network: each of the nodes generating an identifier association table upon receipt of the parent-child declaration, the identifier association table recording therein association of transmitted and received data; and each of the nodes recording the association of transmitted and received data to the identifier association table when transferring the data to a parent node thereof on the basis of the collection network.

In some cases, the identifier association table of each of the nodes includes a transmission-source child-node name representing a transmission source, a reception-complex-data identifier which is an identifier of data received from a child node, a generation-data identifier which is an identifier of data generated by the node, and a transmission-complex-data identifier which is an identifier of data to be transmitted to the parent node.

In some instances, the method further includes the steps of: the server transmitting an ACK for received data to the child nodes on the basis of the collection network; and each of the nodes transmitting an ACK interpretable by the child nodes which is translated from the ACK from the parent node by referring to the identifier association table.

In some embodiments, the method further includes the step of each of the nodes recognizing that the collection network is terminated upon receipt of the ACK from the parent node, and deleting the identifier association table.

Moreover, the broadcasting may be performed using a Peer to Group (P2G) technique.

As another aspect, one or more embodiments of the present invention provide a system for collecting data into a server from a plurality of client computers each having a storage unit, the system including: means for reconstructing a collection network in a tree structure at predetermined time intervals, the collection network having the server acting as a highest node and the plurality of client computers acting as child nodes every time the data is collected; means for causing the server to broadcast a parent-child declaration to the child nodes on the basis of the collection network; means for causing each of the nodes to generate an identifier association table upon receipt of the parent-child declaration, the identifier association table recording therein association of transmitted and received data; and means for causing each of the nodes to record the association of transmitted and received data to the identifier association table when the data is transferred to a parent node thereof on the basis of the collection network.

In some cases, the identifier association table of each of the nodes includes a transmission-source child-node name representing a transmission source, a reception-complex-data identifier which is an identifier of data received from a child node, a generation-data identifier which is an identifier of data generated by the node, and a transmission-complex-data identifier which is an identifier of data to be transmitted to the parent node.

In some instances, the system further includes: means for causing the server to transmit an ACK for received data to the child nodes on the basis of the collection network; and means for causing each of the nodes to transmit an ACK interpretable by the child nodes which is translated from the ACK from the parent node by referring to the identifier association table.

In some embodiments, the system further includes means for causing each of the nodes to recognize that the collection network is terminated upon receipt of the ACK from the parent node, and to delete the identifier association table.

Moreover, the broadcasting may be performed using a Peer to Group (P2G) technique.

As another aspect, one or more embodiments of the present invention provide a server which collects data from a plurality of client computers each having a storage unit, the server including: means for reconstructing a collection network in a tree structure at predetermined time intervals, the collection network having the server acting as a highest node and the plurality of client computers acting as child nodes every time the data is collected; means for broadcasting a parent-child declaration to the child nodes on the basis of the collection network; and means for receiving, as the highest node, data transferred from each of the nodes, the nodes each generating an identifier association table upon receipt of the parent-child declaration, recording association of received and transmitted data to the identifier association table, and thereafter transferring the data to a parent node thereof on the basis of the collection network.

In some cases, the identifier association table of each of the nodes includes a transmission-source child-node name representing a transmission source, a reception-complex-data identifier which is an identifier of data received from a child node, a generation-data identifier which is an identifier of data generated by the node, and a transmission-complex-data identifier which is an identifier of data to be transmitted to the parent node.

In some instances, the server further includes: means for causing the server to transmit an ACK for received data to the child nodes on the basis of the collection network; and means for causing each of the nodes to transmit an ACK interpretable by the child nodes which is translated from the ACK from the parent node by referring to the identifier association table.

As another aspect, one or more embodiments of the present invention provide a client computer which has a storage unit, collects data and transmits the data to a server, the client computer including: means for receiving a collection network in a tree structure as a broadcasted parent-child declaration from the server, the collection network being reconstructed at predetermined time intervals and having the server acting as a highest node and client computers acting as child nodes every time the data is collected; means for generating an identifier association table to which association of transmitted and received data is recorded, in the storage unit, upon receipt of the parent-child declaration; and means for recording the association of the transmitted and received data to the identifier association table when the client computer acting as a child node transfers the data to a parent node thereof on the basis of the collection network.

In some cases, the identifier association table of each of the nodes includes a transmission-source child-node name representing a transmission source, a reception-complex-data identifier which is an identifier of data received from a child node, a generation-data identifier which is an identifier of data generated by the node, and a transmission-complex-data identifier which is an identifier of data to be transmitted to the parent node.

In some instances, the client computer further includes: means for receiving an ACK for data received by the server on the basis of the collection network; and means for transmitting an ACK interpretable by the child nodes which is translated from the ACK from the parent node by referring to the identifier association table.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Aspects of the present invention relate to a highly reliable data collection method, and particularly relate to a method for causing multiple clients to transmit data continuously and stably to a server.

Figure 1:
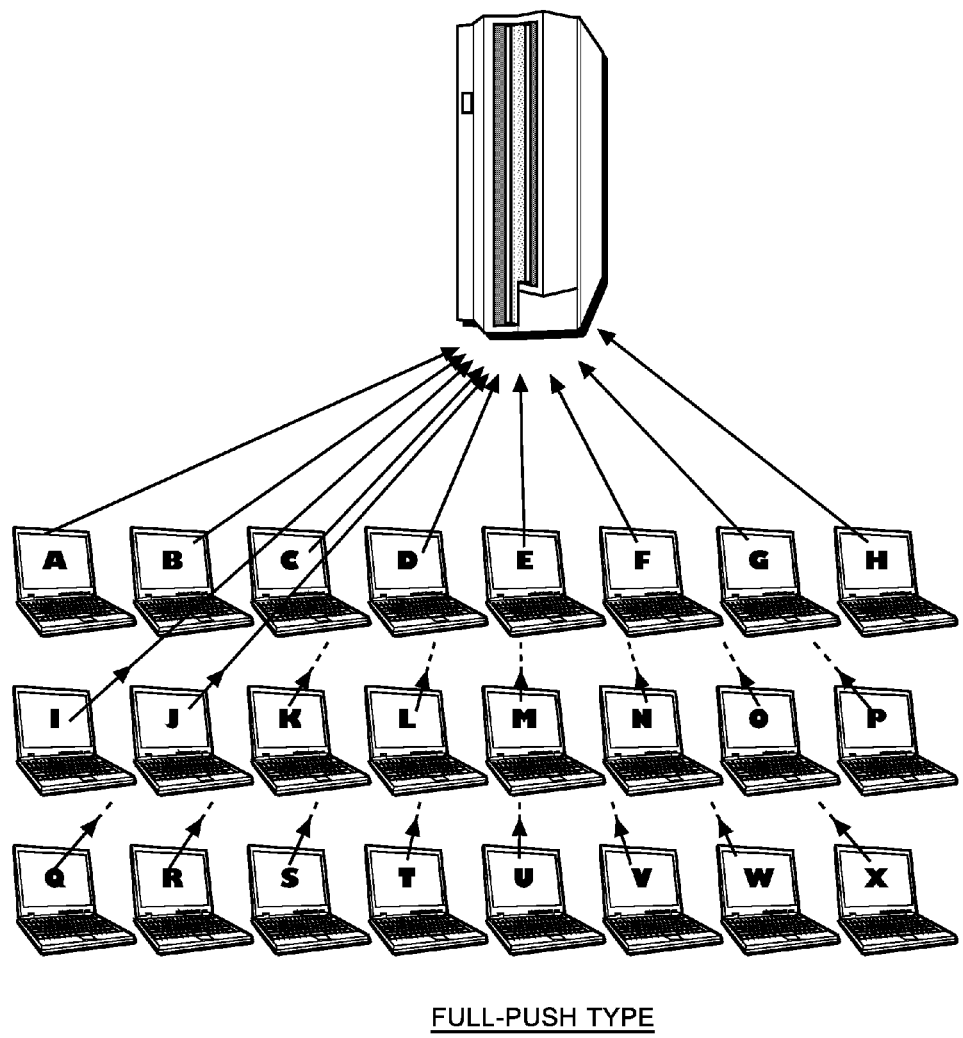
FIG. 1 is a diagram showing a full-push type node configuration.
Figure 2:
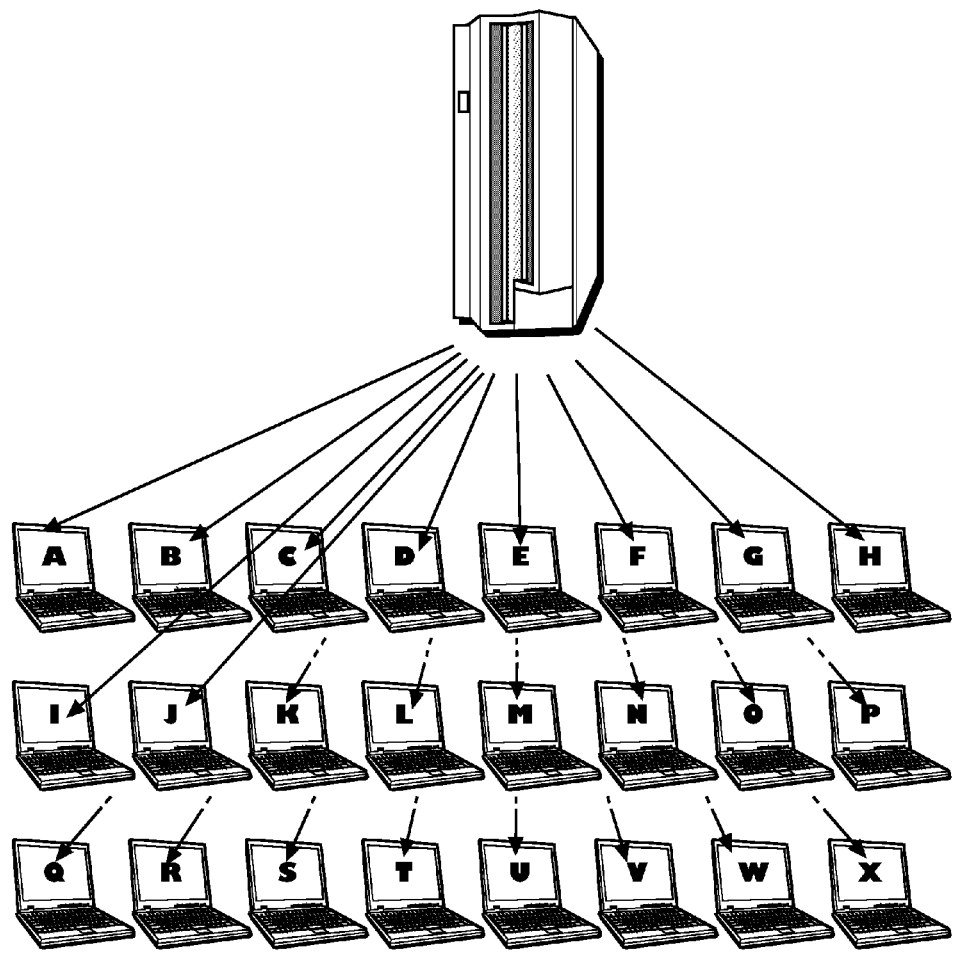
FIG. 2 is a diagram showing a full-pull type node configuration.

For stable data collection, it is necessary to reduce server load, eliminate load concentration on a specific client and to collect data highly reliably. In a system (full-push type) such as a Web server and browsers, clients take the initiative in transmitting data to a server, and in a system (full-pull type) such as a page collection robot of a search engine, a server takes the initiative in collecting data from all clients. The data collected in such systems are in such small units that high load is imposed on the server. FIG. 1 shows a node configuration of full-push type, while FIG. 2 shows a node configuration of full-pull type. Note that since nodes are generally formed of computers, a client computer is hereinafter referred to as a client node or simply a client. A server computer serves as the highest node.

Figure 3:
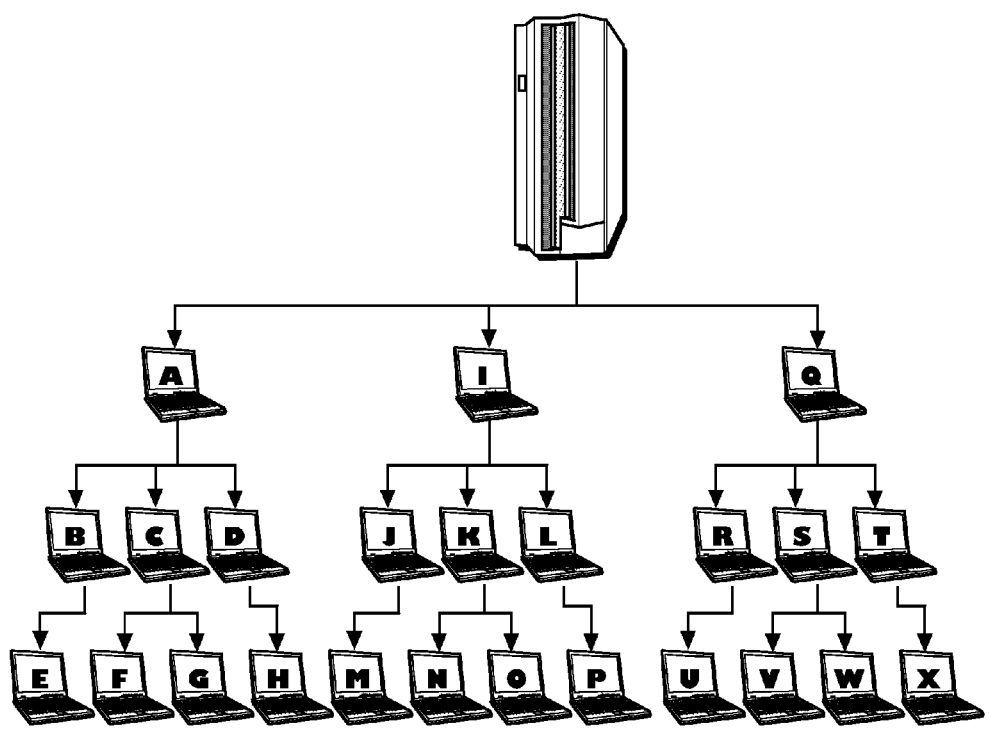
FIG. 3 is a diagram showing a tree-pull type network.

Hence, embodiments of the present invention employs a method (tree-pull type) in which all the clients form a network (collection network) having a tree with a server placed at the highest node in an existing network and collect data hierarchically. By using this method, the server can collect data in large collection units and thus the load thereon is reduced. FIG. 3 shows a network of tree-pull type.

Figure 4:
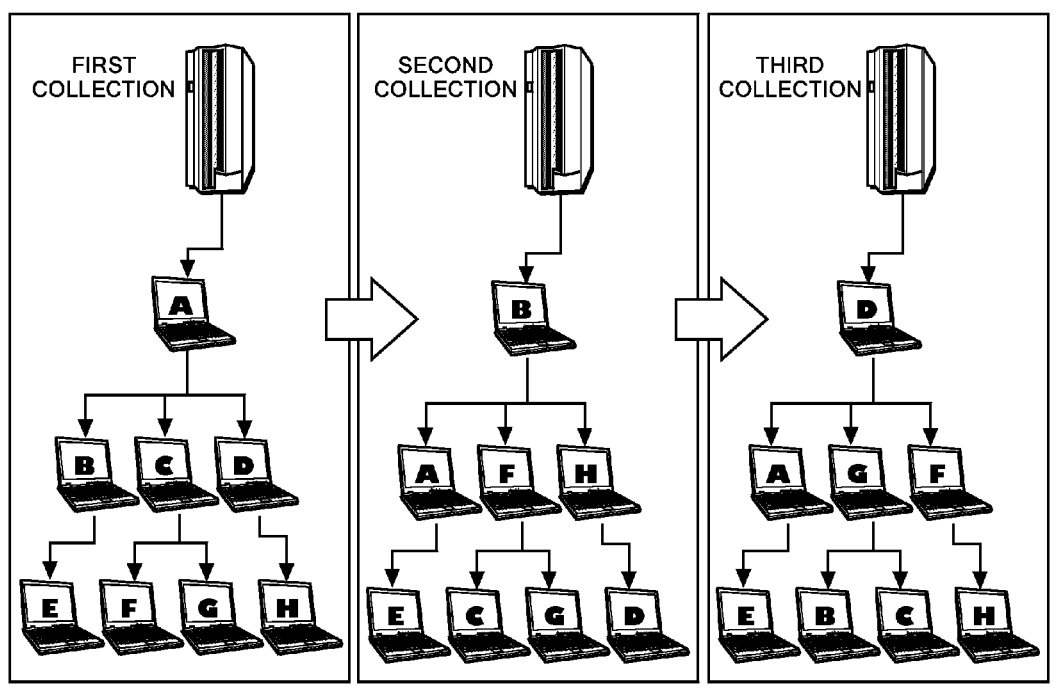
FIG. 4 shows how the first collection network is reconstructed into the second collection network, and further to the third collection network.

In FIG. 3, clients at a higher level are required to receive and transmit large amount of data constantly. In this respect, when the tree structure is fixed, load is likely to be concentrated on specific clients. Hence, if the tree structure is changed regularly, the load can be prevented from being concentrated on the specific clients and thus can be distributed. FIG. 4 illustrates how the first collection network is reconstructed into the second collection network, and further to the third collection network.

In such a temporary network, each of the clients needs to know how far the client has transmitted its data to the server. To put it differently, when a certain relay node is down, or when a certain collection network is terminated, the client needs to know from which data the client should start transmission in a new collection network. Hence, embodiments of the present invention employ a technique by which the server notifies each client which data has been collected (ACK) in a certain collection network.

A notification method in which the server transmits an ACK to each client is conceivable as an embodiment. In the method, since the server broadcasts all the ACKs to all the clients by using a collection network, the load on the server and the clients might be increased. In view of this, embodiments of the present invention employ a method in which clients at the second level below the server interpret an ACK transmitted by the server and having small data volume, and then transfer the interpreted ACK to clients at the third level.
Exemplary Operation Procedures Embodiments of the Invention Firstly, a tree of a network is constructed. There are many techniques for constructing a tree. For example, as the simplest way, a server performs the following steps with all nodes taken into consideration.

(1) The server randomly determines a group of nodes to be placed at the first level.

(2) The server randomly determines a group of nodes to be placed at the second level from among the nodes yet to be determined, and randomly determines a parent node of each node at the second level from among the nodes of the first level.

(3) The server randomly determines a group of nodes to be placed at the third level from among the nodes yet to be determined, and randomly determines a parent node of each node at the third level from among the nodes of the second level.

(4) After determining all the nodes existing in the network in steps (1) to (3) above, the server transmits a tree thus determined to the nodes at the first level.

(5) The nodes at the first level each transfer the received tree to child nodes thereof.

(6) The nodes at the second level each transfer the received tree to child nodes thereof.

In the same manner, the transfer is repeated until the terminal nodes receive the tree. The constructing of the tree is executed at predetermined time intervals. That is, a collection network is reconstructed regularly.

As another example, a tree may be constructed by using the P2G technique (Shuichi Shimizu, "Recursive Point-to-group Routing for Reliable End-host Multicast." Transactions of Information Processing Society of Japan, Vol. 49, No. 3, March 2008, fully incorporated herein by reference in its entirety for all purposes). In the case of P2G, a server does not have to know all the nodes. Instead, nodes including the server function in a state where the nodes each know a certain number of nodes.

Figure 5:
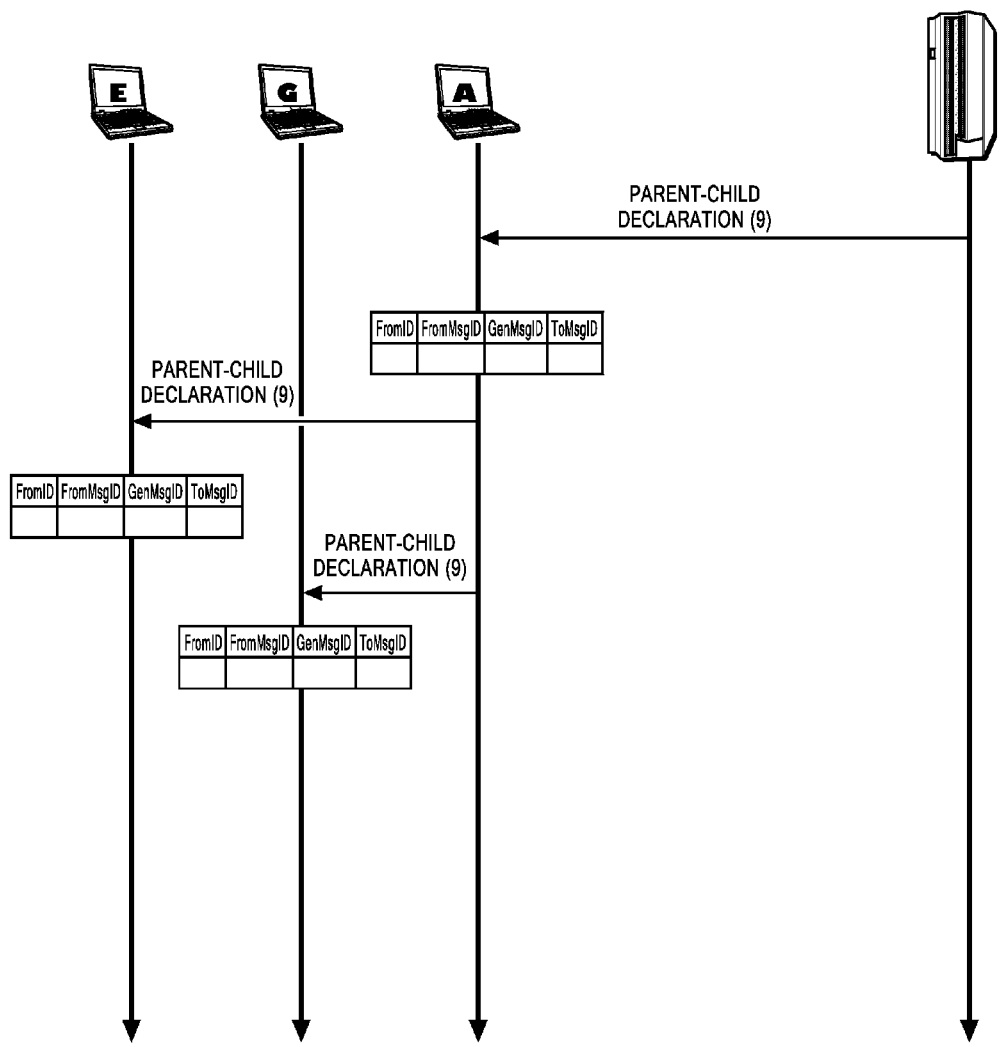
FIG. 5 is a diagram showing that a parent node broadcasts a parent-child declaration to child nodes.

When the tree determined in reconstructing the network is transferred, a parent-child declaration is made. FIG. 5 shows how a parent node broadcasts a parent-child declaration to child nodes thereof. In FIG. 5, the parent-child declaration may be broadcasted by the P2G technique. In FIG. 5, the server transmits a parent-child declaration (9) to a child node thereof. In diagrams hereinafter referred to, communication between nodes is shown in a horizontal direction, while a time flow is shown in a vertical direction. In embodiments of the present invention, a parent-child declaration is made every time a network is reconstructed. Reference numeral 9 is the reconstruction number, and shows that this network is the ninth network. The parent-child declaration is transmitted firstly to a child node A at a level which is one level below the server in accordance with the determined tree, and then transmitted from the child node A to child nodes E and G thereof.

Figure 12:
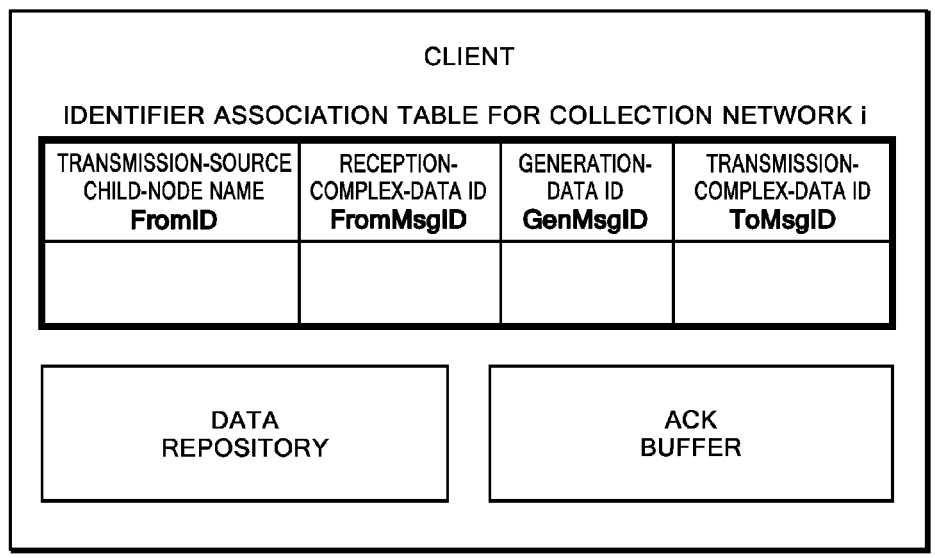
FIG. 12 is a diagram showing an identifier association table in each node.

Each of the nodes having received the parent-child declaration clears an identifier association table for recording association of transmitted and received data. FIG. 12 shows the identifier association table. The identifier association table includes: a transmission-source child-node name indicating a transmission source; a reception-complex-data identifier which is an identifier of data received from a child node; a generation-data identifier which is an identifier of data generated by the node; and a transmission-complex-data identifier which is an identifier of data to be transmitted to a parent node.

The data shown in the identifier association table is roughly divided into two types of data: generation data; and complex data. The generation data is data generated by each node, and has a generation-data ID. The generation-data ID is uniquely determined in the node. The complex data is data to be transmitted by the node to a parent node thereof and has a complex-data ID. The complex-data ID is uniquely determined by a node transmitting the complex data. The transmission-source child-node name is represented by an ID of a child node which has transmitted data. Meanwhile, each node includes: a data repository as a storage area for data to be transmitted; and an ACK buffer for storing therein data of an ACK indicating that the server has received data.

The identifier association table serves to associate generation data and transmission complex data with each other, and reception complex data and transmission complex data with each other. In other words, the identifier association table is a table for recording what is received, transmitted and generated by the node. Specifically, as for association between generation data and transmission complex data, a generation-data ID and a complex-data ID of transmitted complex data including the generation data having the generation-data ID are associated with each other. As for association between reception complex data and transmission complex data, a complex-data ID of complex data received from a child node and a complex-data ID of transmitted complex data including the received complex data are associated with each other. Note that when the reception complex data and the transmission complex data are associated with each other, a node ID with which the reception complex data has been transmitted is also associated therewith.

Figure 6:
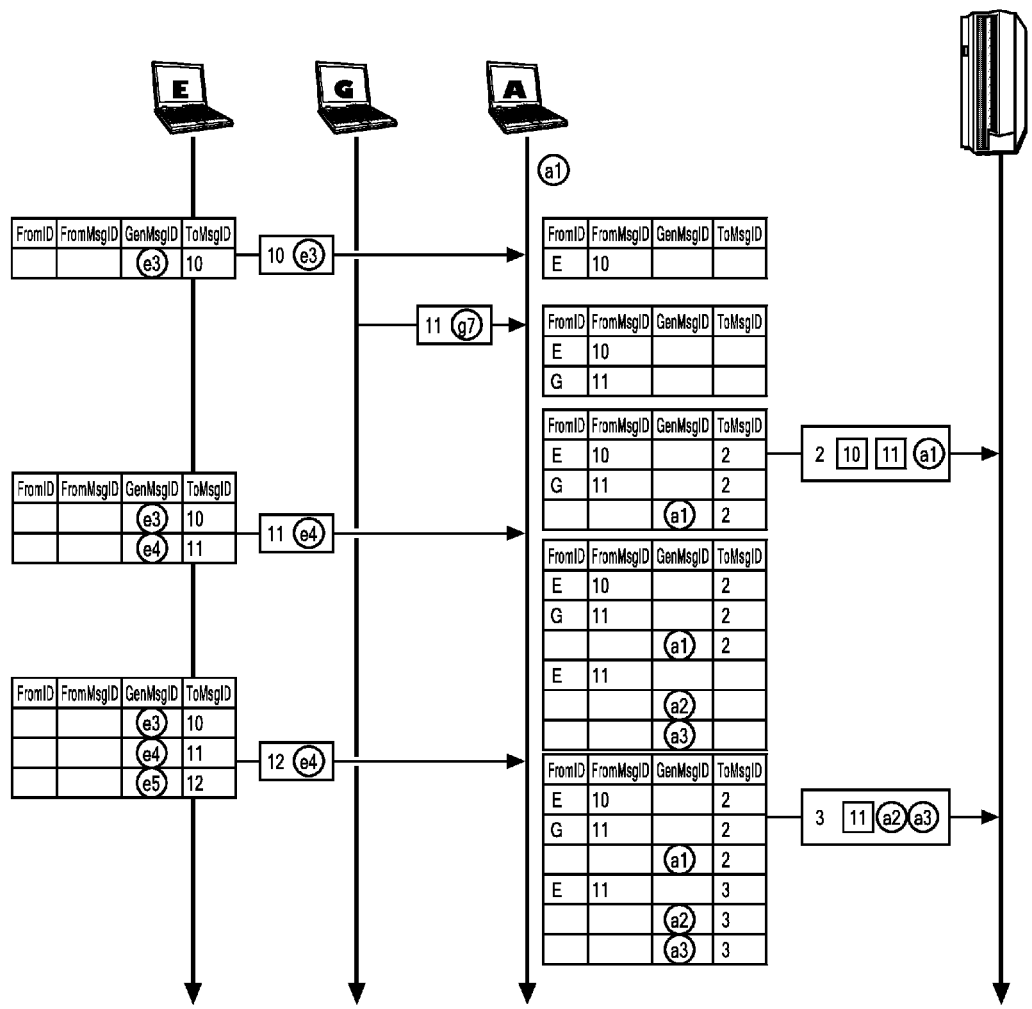
FIG. 6 is a diagram showing how data is transferred.

The nodes among which the parent-child declaration has been made transfer data. When transferring data, the nodes each record the contents of the transfer in the identifier association table. FIG. 6 shows how data is transferred. The node E at the lowest level assigns 10 as a transmission-complex-data ID to data e3 generated by the node E, and transmits the data e3 to its parent node A placed at the next level. The node A also receives, from another child node G, data g7 to which 11 is assigned as its transmission-complex-data ID. These are added to the identifier association table of the node A. Next, the node A transmits, to the server, the received data as well as data a1 generated by the node A both of which are assigned 2 as a transmission-complex-data ID. The node A transmits data to the server at regular intervals. Thus, when transmitting data, the node A assigns the same transmission-complex-data ID to data accumulated until the transmission. In the next transmission, the node A assigns 3 as the transmission-complex-data ID to accumulated data in this manner. When there is no data to be transmitted, the node A transmits no data.

Although the server wants to notify each client which data the server has received, transmitting an ACK to each client leads to an increase of communication times and thus high load. Furthermore, broadcasting every ACK in a collection network used in data collection leads to a high communication cost. In view of these problems, in embodiments of the present invention, each node records association between received data and transferred data by using an identifier association table, and translates an ACK from a parent node thereof into an ACK interpretable by child nodes thereof. Thereby, each client knows data having not been received by the server and thus holds the data therein. Then, before transitioning to the next collection network, a parent node passes on, to child nodes thereof, information indicating which identifiers have been received by the server, thereby transmitting an ACK efficiently.

Figure 7:
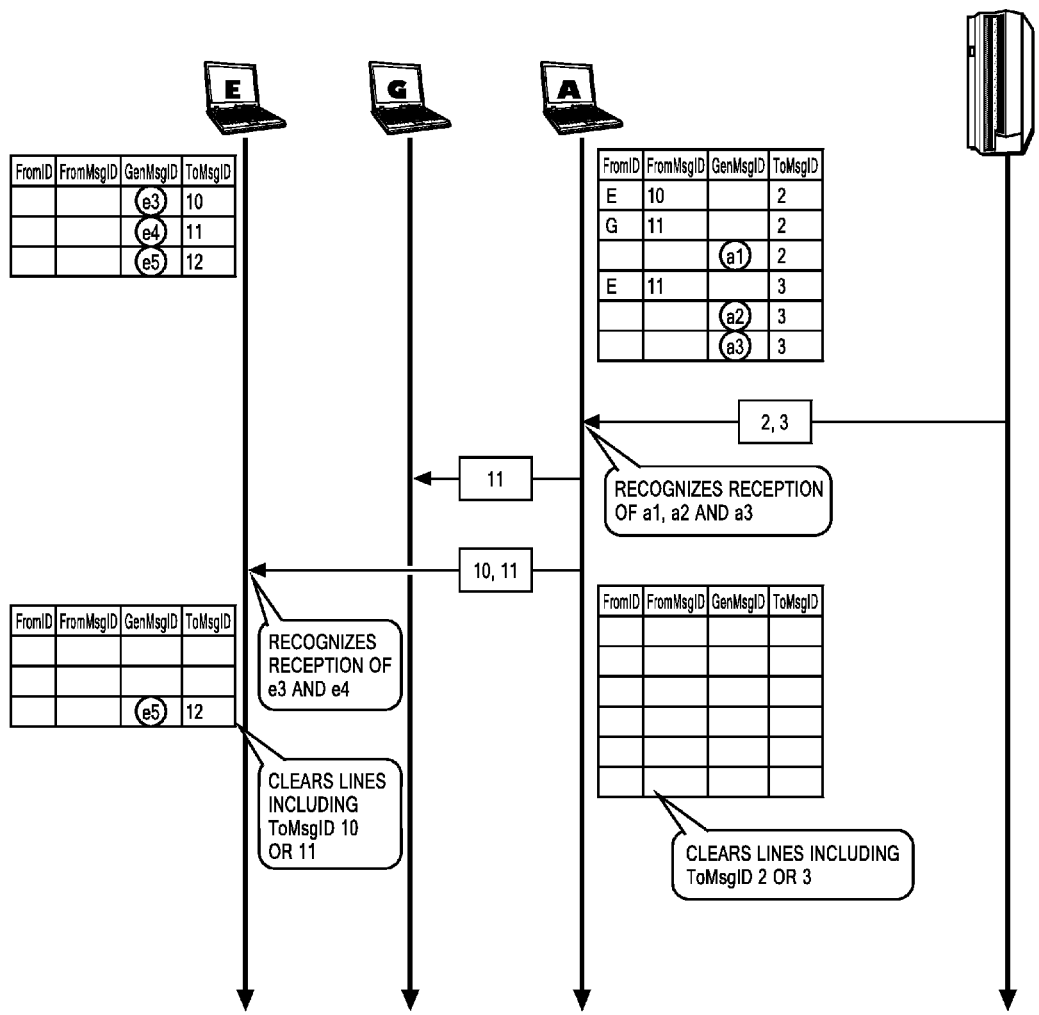
FIG. 7 is a diagram showing an ACK flow in an embodiment of the present invention.

FIG. 7 shows the ACK flow. The server transmits an ACK indicating that the server has received transmission-complex-data IDs 2 and 3 to the node A at the next level. The node A locates a reception-complex-data ID associated with the transmission-complex-data ID 2 or 3 in the identifier association table. In this case, the node E has reception-complex-data IDs 10 and 11, and the node G has a reception-complex-data ID 11. The node A transmits, to the child node E thereof, an ACK indicating that the server has received the reception-complex-data IDs 10 and 11. Similarly, the node A transmits, to the child node G thereof an ACK indicating that the server has received the reception-complex-data ID 11. Thereafter, the node A deletes the lines including the transmission-complex-data ID 2 or 3 in the identifier association table. The nodes E and G having received the ACK each delete lines including the reception-complex-data ID 10 or 11 in the identifier association table. In this manner, the ACK of the data received by the server efficiently reaches the terminal nodes.

Figure 8:
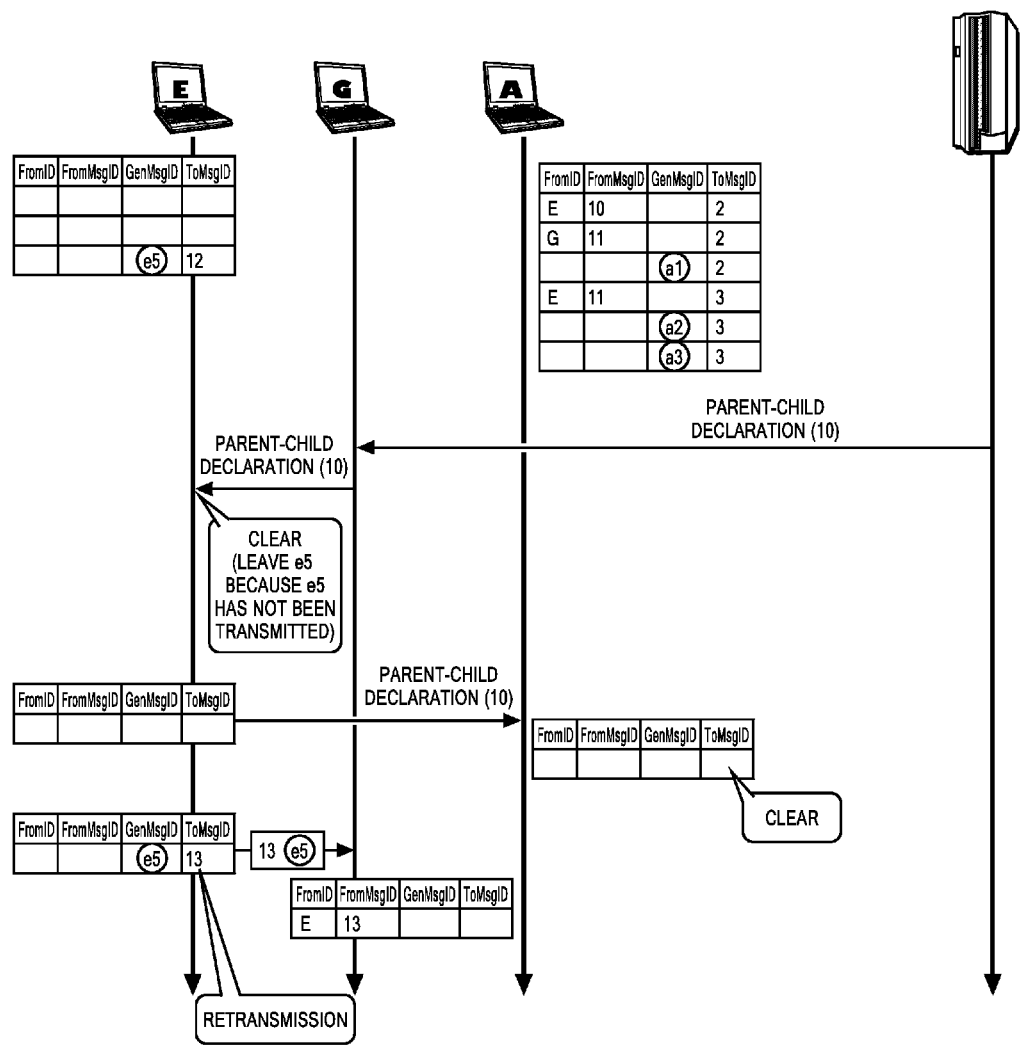
FIG. 8 is a diagram showing how data yet to be transmitted is transmitted.

Reception of an ACK means termination of a collection network. Each client discards a previous identifier association table to wait for reconstruction of a next collection network. When the next collection network is reconstructed, the client starts transmitting data yet to be transmitted by using the next collection network. FIG. 8 illustrates the transmission of data yet to be transmitted. When the server makes a parent-child declaration based on a new tree, each client node discards the identifier association table but does not clear data yet to be transmitted. In FIG. 8, the server makes a parent-child declaration 10 to the node G serving as a child node thereof, and the node G makes a parent-child declaration to the node E serving as a child node thereof. At this time, the node E does not delete the line including data e5, because the data e5 has not been transmitted yet. The node E makes a parent-child declaration to the node A serving as a child node thereof, assigns a transmission-complex-data ID 13 to the data e5 yet to be transmitted, and then transmits the data e5 to the node G serving as a new parent node thereof.

Figure 9:
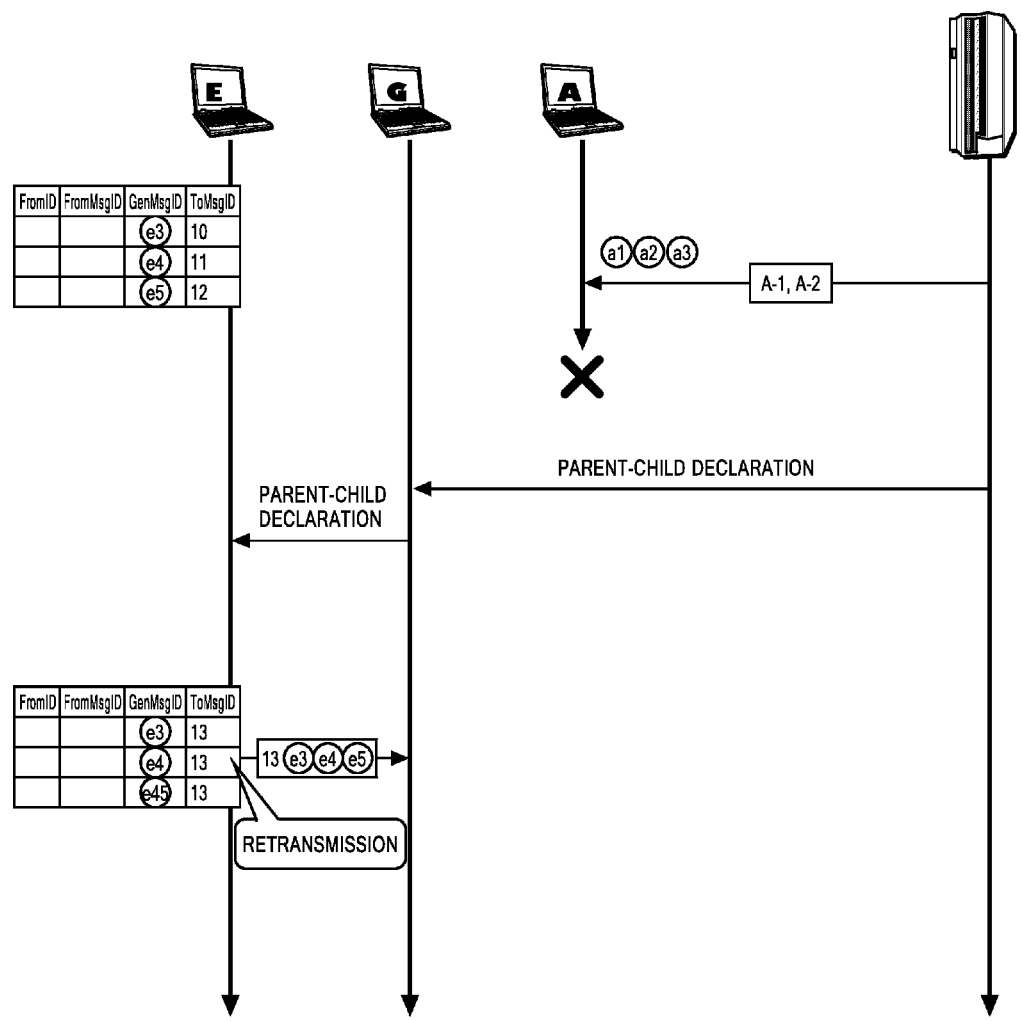
FIG. 9 is a diagram showing an ACK flow in a case of a failure of a relay node.

If a relay node is down, child nodes cannot receive an ACK. In this case, all the data are considered to have not been transmitted in the collection network, and the data are to be retransmitted. FIG. 9 illustrates an ACK in the case where a relay node is down. If an ACK reception for the transmission-complex-data ID 13 of the node E fails because the relay node A is down, the node E retransmits all the data e3, e4 and e5 thereof to a new parent node when the next parent-child declaration is made. In FIG. 9, the server makes a parent-child declaration to the node G serving as a child node thereof, and the node G makes a parent-child declaration to the node E serving as a child node thereof. At this time, the node E retransmits the data e3, e4 and e5 for which the node E cannot receive the ACK, to the node G serving as a new parent node thereof.

Figure 11:
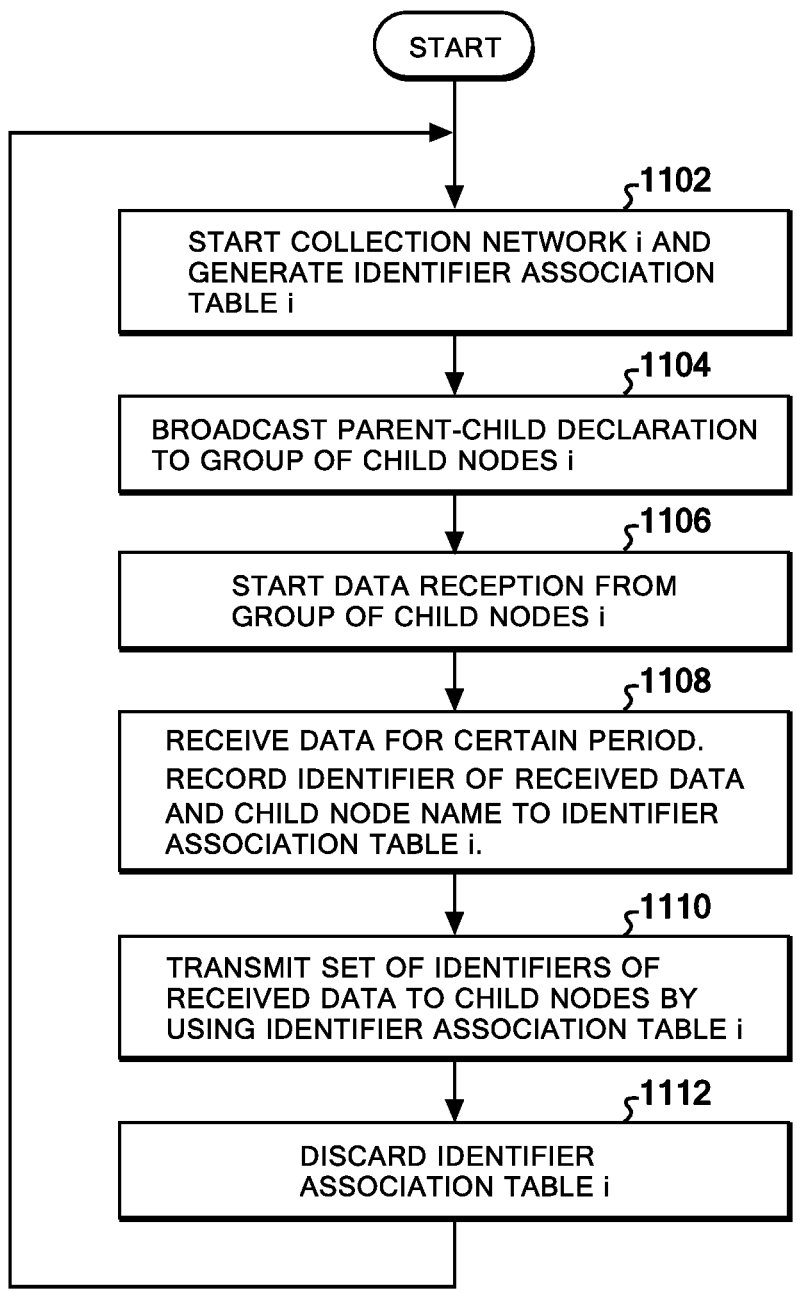
FIG. 11 is a flowchart of processing by the server.

FIG. 11 shows a flowchart of processing by the server. Firstly, in step 1102, the server starts a collection network i and generates an identifier association table i. Next, in step 1104, the server broadcasts a parent-child declaration to a group of child nodes i. In step 1106, the server starts receiving data from the group of child nodes i. In step 1108, the server receives data for a certain time period, and records identifiers of the received data and the names of child nodes having transmitted the data, to the identifier association table i. Thereafter, in step 1110, the server transmits a set of the identifiers of the received data as an ACK to the child nodes by using the identifier association table i. Lastly, in step 112, the server discards the identifier association table i.

Figure 13:
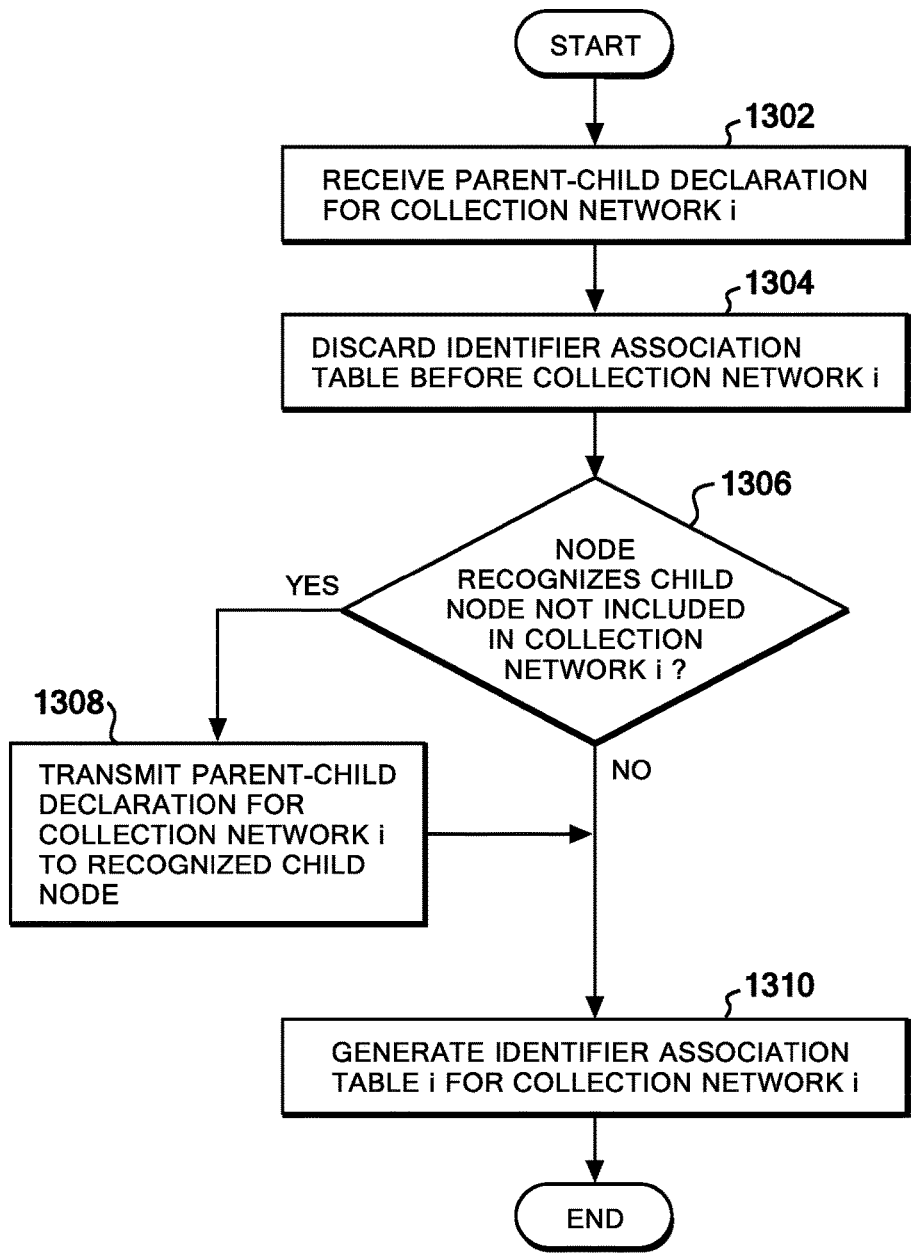
FIG. 13 is a flowchart of the node generating the identifier association table for a collection network.

FIG. 13 shows a flowchart of each client node generating an identifier association table for a collection network. Firstly, in step 1302, the client node receives a parent-child declaration for a collection network i. Next, in step 1304, the client node discards an identifier association table before the collection network i. Then, in step 1306, the client node checks whether the client node recognizes any child node not included in the collection network i. If the client node recognizes a child node not included in the collection network i, the client node transmits a parent-child declaration for the collection network i to the recognized child node in step 1308. If there is no child node not included in the collection network i, the client node generates an identifier association table i for the collection network i in step 1310.

Figure 14:
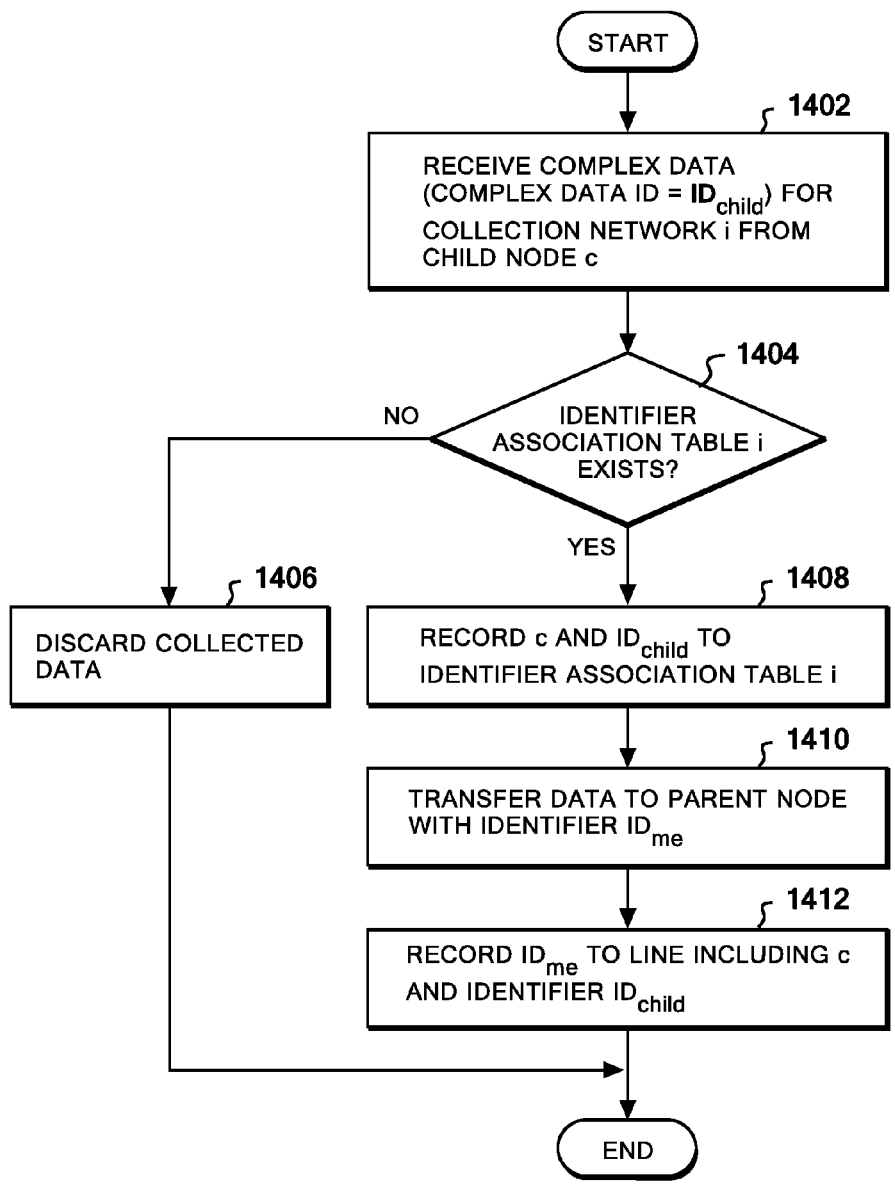
FIG. 14 is a flowchart of recording the identifier association table for a collection network in the node.

FIG. 14 shows a flow chart of the client node recording an identifier association table for a collection network. Firstly, in step 1402, the client node receives complex data with ID(Child) for a collection network i from a child node c. Next, in step 1404, the client node determines whether or not an identifier association table i exists. If the identifier association table i does not exist in step 1404, in step 1406 the client node discards collected data to terminate the processing. If the identifier association table i exists in step 1404, in step 1408 the client node records c and ID(Child) in the identifier association table i. Then, in step 1410, the client node transfers the complex data with an identifier ID(me) to the parent node. Lastly, in step 1412, the client node records ID(me) in a line including c and ID(child).

Figure 15:
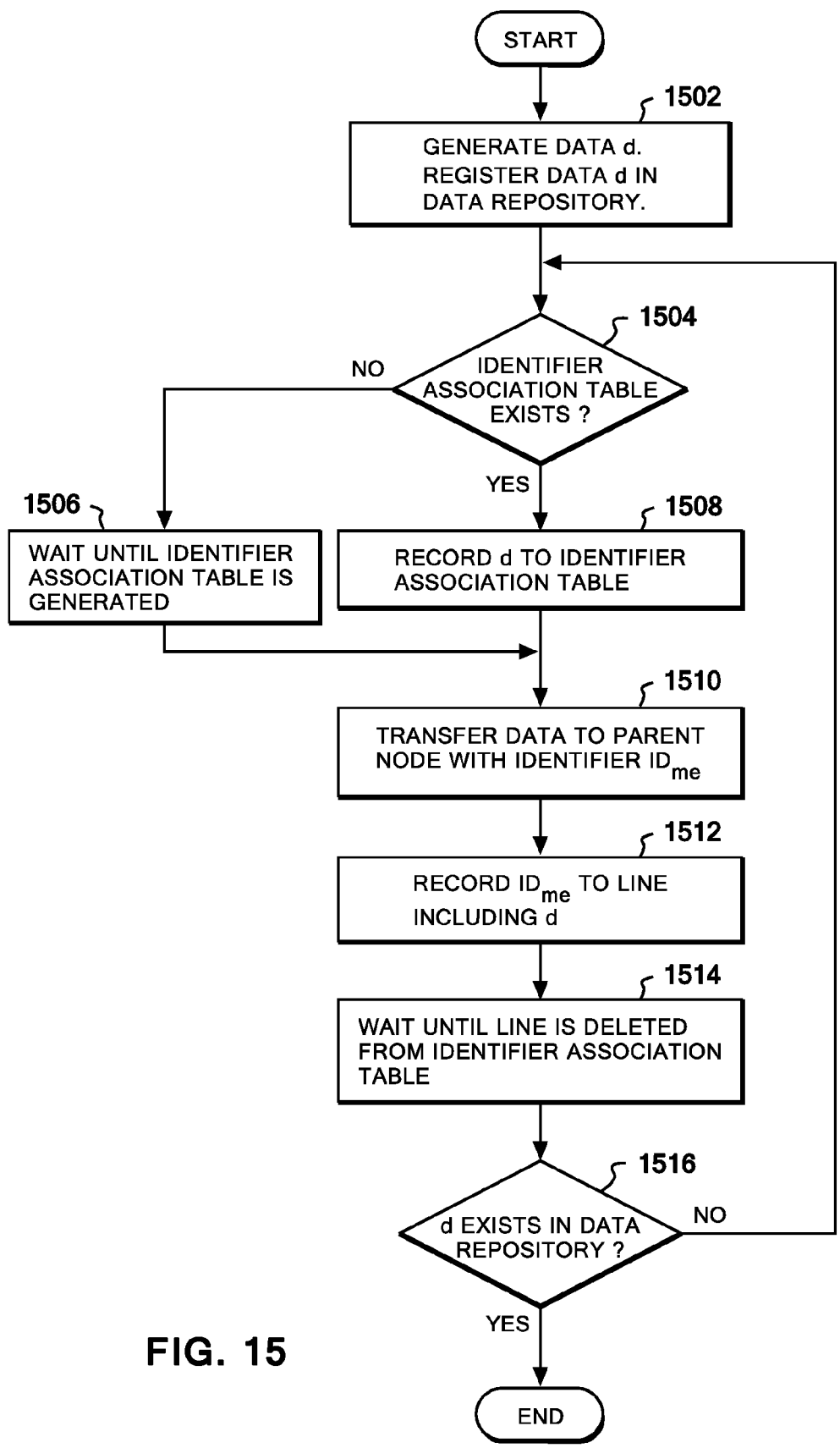
FIG. 15 is a flowchart of the node generating data and registering data to a data repository.

FIG. 15 shows a flowchart of the client node generating data and registering the data to the data repository. In step 1502, the client node generates data d and registers the data d in the data repository. Next, in step 1504, the client node determines whether or not an identifier association table exists. If the identifier association table does not exist, in step 1506 the client node waits until an identifier association table is generated. If the identifier association table exists, in step 1508 the client node records d in the identifier association table. Then, in step 1510, the client node transmits the data with an identifier ID(me), to the parent node. Thereafter, in step 1512, the client node records ID(me) in a line including the d. Subsequently, in step 1514, the client node waits until the line including d is deleted from the identifier association table. Lastly, in step 1516 the client node determines whether or not the data d exists in the data repository. If not, the client node returns to step 1504. If so, the client node terminates the processing.

Figure 16:
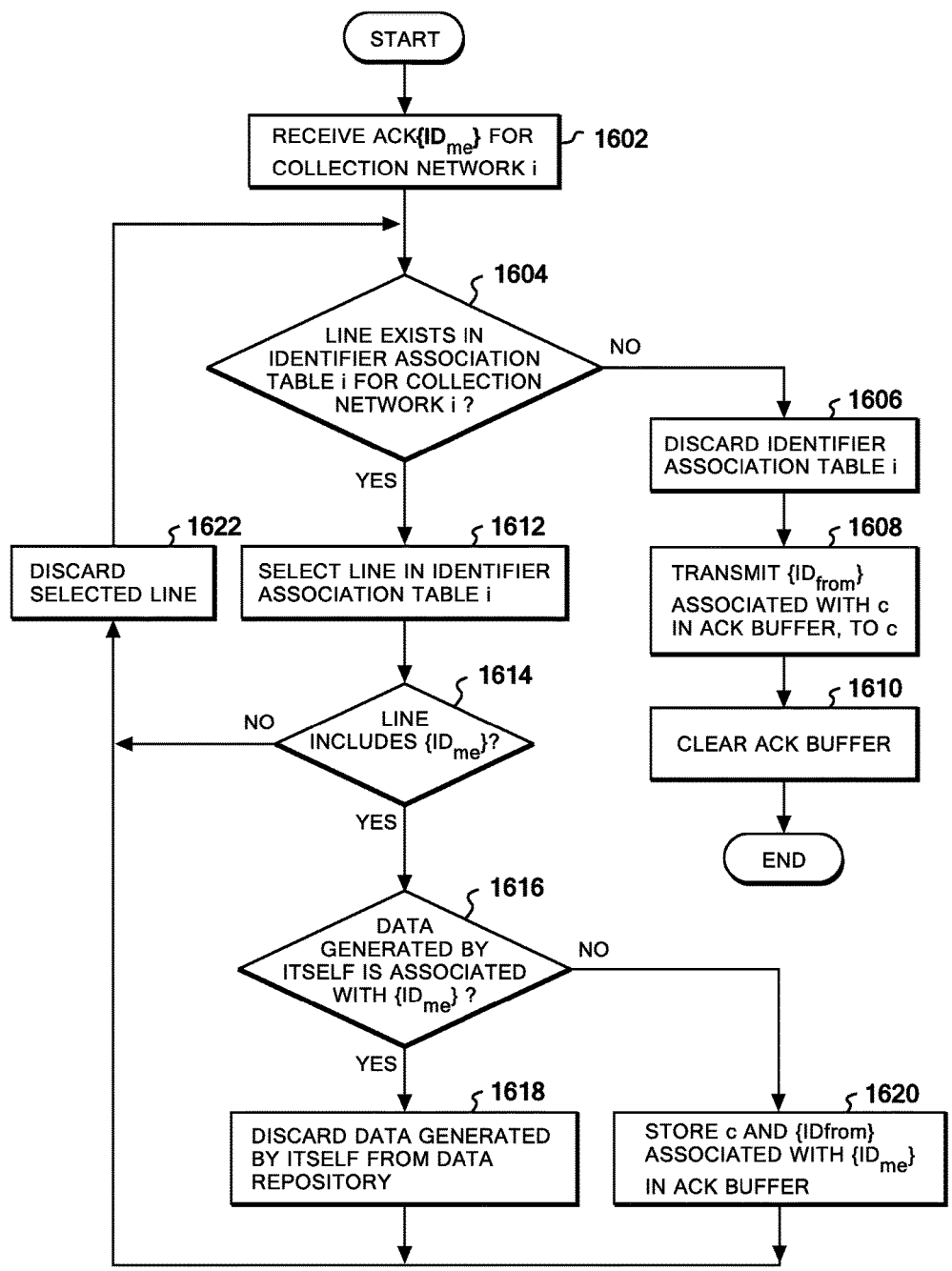
FIG. 16 is a flowchart of the node using the data repository and an ACK buffer on the basis of the identifier association table.

FIG. 16 shows a flowchart of using the data repository and the ACK buffer on the basis of the identifier association table in the client node. In step 1602, the client node receives an ACK {IDme} for a collection network i. Next, in step 1604, the client node determines whether or not a line exists in an identifier association table i for the collection network i. If not, the processing proceeds to step 1606.

In step 1606, the client node discards the identifier association table i. Next, in step 1608, the client node transmits {IDfrom}, which is associated with c in the ACK buffer, to the child node c. Lastly, in step 1610, the client node clears the ACK buffer to terminate the processing.

If a line exists in the identifier association table for the collection network i in step 1604, the processing proceeds to step 1612. In step 1612, the client node firstly selects a line in the identifier association table i. Next, in step 1614, the client node determines whether or not the selected line includes {IDme}. If not, the client node proceeds to step 1622 to discard the selected line and then returns to step 1604. If the selected line includes {IDme} in step 1614, in step 1616 the client node determines whether or not data generated by itself is associated with {IDme}. If so, in step 1618 the client node discards the data generated by itself from the data repository. If not, in step 1620 the client node stores c and {IDfrom} associated with the {IDme} in the ACK buffer and then proceeds to step 1622.

Block Diagram of Computer Hardware

Figure 10:
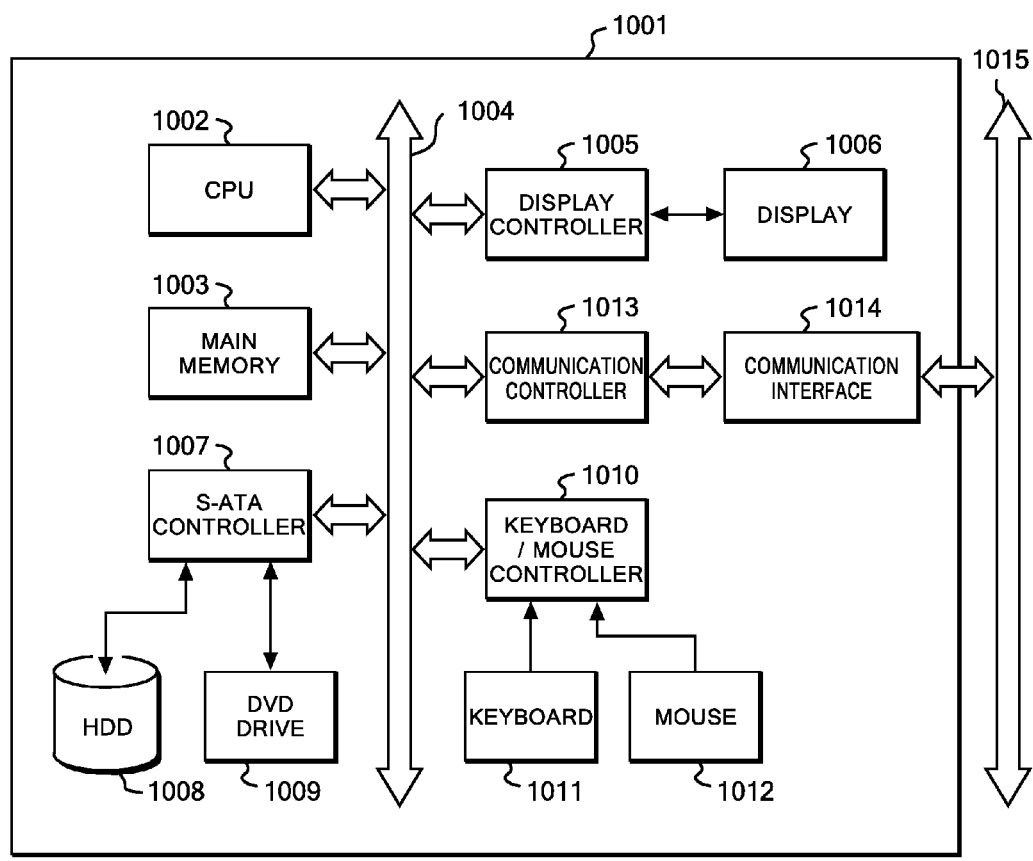
FIG. 10 is an example of a block diagram of computer hardware of the server or each of client nodes.

FIG. 10 shows, as an example, a block diagram of computer hardware of the server or each of the client nodes in an embodiment of the present invention. A computer system (1001) in the embodiment of the present invention includes a CPU (1002) and a main memory (1003), which are connected to a bus (1004). The CPU (1002) is preferably based on 32-bit or 64-bit architecture, and, for example, the XEON series, the CORE series, the ATOM series, the PENTIUM series and the CELERON series of Intel Corp., and the PHENOM series, the ATHLON series, the TURION series and the SEMPRON series of AMD, Inc., and the like can be used.

A display (1006) such as an LCD monitor is connected to the bus (1004) through a display controller (1005). The display (1006) is used, in order to manage the computer system (1001), for displaying information on the computer system (1001) connected to a network through a communication line and information on software currently running on the computer system (1001), through a suitable graphic interface. To the bus (1004), a hard disk or a silicon disk (1008), and a CD-ROM, a DVD or a Blu-ray drive (1009) are also connected through an IDE or SATA controller (1007).

In the hard disk (1008), an operating system, a program including codes for communication between the clients and the server of embodiments of the present invention, and data are stored so as to be loadable into a main memory (1003). Data used for communication processing of embodiments of the present invention is stored in the hard disk (1008) or the main memory (1003) and processed by the CPU (1002).

The CD-ROM, DVD or Blu-ray drive (1009) is used for additionally installing a program into the hard disk from a CD-ROM, DVD or Blu-ray disc where necessary. To the bus (1004), furthermore, a keyboard (1011) and a mouse (1012) are connected through a keyboard/mouse controller (1010).

A communication interface (1014) complies with, for example, an ETHERNET protocol, and is connected to the bus (1004) through a communication controller (1013). The communication interface (1014) serves to physically connect the computer system (1001) and a communication line (1015) to each other, and provides a network interface layer to a TCP/IP communication protocol of a communication function of an operating system for the computer system (1001). Incidentally, the communication line may be configured as a wired LAN environment, or a wireless LAN environment based on a wireless LAN connection standard such as IEEE802.11a/b/g/n. The communication between the clients and the server is performed through the communication interface (1014).

Having reviewed the disclosure herein, including FIG. 10, the skilled artisan will appreciate that aspects of the present invention may take the form of a computer program product embodied in one or more computer readable medium(s) having computer readable program code embodied thereon. Any combination of one or more computer readable medium(s) may be utilized. The computer readable medium may be a computer readable signal medium (e.g., signals on line 1015) or a computer readable storage medium (e.g., HDD 1008, DVD in drive 1009). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Distinct software modules for carrying aspects of embodiments of the invention can be, in at least some cases, embodied on a computer readable storage medium In embodiments of the present invention, a temporary collection network (tree structure) formed of clients is autonomously generated. This can eliminate a dedicated intermediate server. A mechanism of regularly updating a data collection network can avoid data collection stagnation caused by failure of a specific node and collection load concentration, and can keep latency low.

In addition, aggregated information on data of nodes at different levels is held in the temporary collection network, and thereby effective delivery confirmation can be achieved. Data is retransmitted in a different collection network, and thereby failure resistance is achieved. In addition, combination with delivery confirmation can secure reliability.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of collecting data into a server from a plurality of client computers each having a storage unit, the method comprising the steps of:

reconstructing, by the server, a collection network in a tree structure at predetermined time intervals, the collection network comprising a highest node embodied by the server and a plurality of child nodes embodied by respective ones of the plurality of client computers;

broadcasting, by the server, a parent-child declaration to the client computers through the collection network, the parent-child declaration assigning different ones of the client computers to different levels of the collection network;

receiving, by the server, data accumulated by at least one client computer of the client computers disposed in a level one below the server in the collection network;

transmitting, by the server, an ACK for the data accumulated by the server to the at least one client computer disposed in the level one below the server in the collection network, wherein the ACK causes the at least one client computer disposed in the level one below the server to delete an entry in an identifier association table associated with the data accumulated by the server and maintain at least one entry in the identifier association table including data yet to be acknowledged by the server for transmission in a next reconstructed collection network;

generating, by each of the client computers, an identifier association table upon receipt of the parent-child declaration, the identifier association table recording therein association of transmitted and received data; and recording, by each of the client computers, the association of transmitted and received data to the identifier association table when transferring the data to a parent node thereof through of the collection network, wherein the identifier association table of each of the client computers includes a transmission-source child-node name representing a transmission source, a reception-complex-data identifier which is an identifier of data received from a child node of a respective client computer, a generation-data identifier which is an identifier of data generated by the respective client computer, and a transmission-complex-data identifier which is an identifier of data to be transmitted to the parent node of the respective client computer.

2. The method according to claim 1, wherein transmitting, by the server, the ACK for the data accumulated by the server to the at least one client computer disposed in the level one below the server in the collection network further comprises the steps of:

transmitting, by the server, the ACK for the data accumulated to the at least one client computer disposed at the level one below said server in the collection network; and transmitting, through of the collection network, the ACK, wherein the ACK is translated by the client computers at each level of the collection network into an ACK interpretable by the client computers of a next lower level by referring to the identifier association table.

3. The method according to claim 1, further comprising causing, by the server, the at least one client computer of the client computers to delete the identifier association table associated with the collection network, terminating the collection network.

4. The method according to claim 1, wherein the broadcasting is performed using a Peer to Group technique.

5. The method according to claim 1, wherein the data is accumulated through the collection network from a lowest level up to the level one below the server, and the server directly communicates only with ones of the client computers at the level one below the server, and wherein the level one below the server has a relay to a next lower level.

6. The method according to claim 1, wherein the at least one client computer retransmits data upon the reconstruction of the next reconstructed collection network upon determining that no ACK is received from the server for the data to be retransmitted.

7. A system for collecting data into a server from a plurality of client computers each having a storage unit, the system comprising:
  means for transmitting an ACK for data accumulated by the server to the client computers in a collection network;
  means for reconstructing the collection network in a tree structure at predetermined time intervals, the collection network comprising a highest node embodied by the server and a plurality of child nodes embodied by respective ones of the plurality of client computers;
  means for causing the server to broadcast a parent-child declaration to the client computers through the collection network, the parent-child declaration assigning different ones of the client computers to different levels of the collection network;
  means for causing each of the client computers to generate an identifier association table upon receipt of the parent-child declaration, the identifier association table recording therein association of transmitted and received data;
  means for causing each of the client computers to record the association of transmitted and received data to the identifier association table when the data is transferred to a parent node thereof on the basis of the collection network; and
  means for causing each of the client computers to delete an entry in the identifier association table associated with the data accumulated by the server and maintain at least one entry in the identifier association table including data yet to be acknowledged by the server for transmission in a next reconstructed collection network,
  wherein the identifier association table of each of the client computers includes a transmission-source child-node name representing a transmission source, a reception-complex-data identifier which is an identifier of data received from a child node of a respective client computer, a generation-data identifier which is an identifier of data generated by the respective client computer, and a transmission-complex-data identifier which is an identifier of data to be transmitted to the parent node of the respective client computer.

8. The system according to claim 7, further comprising:
  means for causing the server to transmit the ACK for the data accumulated by the server to the client computers disposed at the level one below said server in the collection network; and
  means for causing each of the child nodes to transmit, through of the collection network, the ACK, wherein the ACK is translated by the client computers at each level of the collection network into an ACK interpretable by the client computers of a next lower level by referring to the identifier association table.

9. The system according to claim 7, further comprising means for causing each of the client computers to recognize that the collection network is terminated upon receipt of the ACK from a parent node in the collection network, and to delete the identifier association table.

10. The system according to claim 7, wherein the broadcasting is performed using a Peer to Group technique.

11. A server which collects data from a plurality of client computers each having a storage unit, the server comprising:
  means for transmitting an ACK for data accumulated by the server to the client computers in a collection network, wherein the ACK causes each of the client computers to delete an entry in an identifier association table associated with the data accumulated by the server and maintain at least one entry in the identifier association table including data yet to be acknowledged by the server for transmission in a reconstructed collection network;
  means for reconstructing the reconstructed collection network in a tree structure at predetermined time intervals, the reconstructed collection network comprising a highest node embodied by the server and a plurality of child nodes embodied by respective ones of the plurality of client computers;
  means for broadcasting a parent-child declaration to the client computers through the reconstructed collection network, the parent-child declaration assigning different ones of the client computers to different levels of the reconstructed collection network; and
  means for receiving, at the highest node, data accumulated by at least one client computer of the client computers disposed in a level one below the server in the reconstructed collection network, the data being transferred from each of the client computers, the client computers each generating a next reconstructed identifier association table upon receipt of the parent-child declaration, recording association of received and transmitted data to the next reconstructed identifier association table, and thereafter transferring the data to a parent node thereof through the reconstructed collection network,
  wherein the identifier association table of each of the client computers includes a transmission-source child-node name representing a transmission source, a reception-complex-data identifier which is an identifier of data received from a child node of a respective client computer, a generation-data identifier which is an identifier of data generated by the respective client computer, and a transmission-complex-data identifier which is an identifier of data to be transmitted to the parent node of the respective client computer.

12. The server according to claim 11, further comprising:
  means for causing the server to transmit the ACK for the data accumulated by the server to the client computers disposed at the level one below said server in the collection network; and
  means for causing each of the client computers to transmit, through of the collection network, the ACK, wherein the ACK is translated by the client computers at each level of the collection network into an ACK interpretable by the client computers of a next lower level by referring to the identifier association table.

13. A client computer which has a storage unit, collects data and transmits the data to a server, the client computer comprising:
  means for receiving a collection network in a tree structure as a broadcasted parent-child declaration from the server, the collection network being reconstructed at predetermined time intervals and comprising a highest node embodied by the server and a plurality of child nodes embodied by respective ones of a plurality of client computers, the parent-child declaration assigning different ones of the client computers to different levels of the collection network;

means for generating an identifier association table to which association of transmitted and received data is recorded, in the storage unit, upon receipt of the parent-child declaration;

means for recording the association of the transmitted and received data to the identifier association table when the client computer acting as a child node transfers the data to a parent node thereof through the collection network; and means for receiving an ACK for data accumulated by the server from the client computer in the collection network, wherein the ACK causes the client computer to delete an entry in the identifier association table associated with the data accumulated by the server and maintain at least one entry in the identifier association table including data yet to be acknowledged by the server for transmission in a reconstructed collection network, wherein the identifier association table of each of the client computers includes a transmission-source child-node name representing a transmission source, a reception-complex-data identifier which is an identifier of data received from a child node of a respective client computer, a generation-data identifier which is an identifier of data generated by the respective client computer, and a transmission-complex-data identifier which is an identifier of data to be transmitted to the parent node of the respective client computer.

14. The client computer according to claim 13, further comprising:

means for receiving the ACK for data accumulated by the server through the collection network; and means for transmitting, through of the collection network, the ACK, wherein the ACK is translated by the client computers at each level of the collection network into an ACK interpretable by the client computers of a next lower level by referring to the identifier association table.

* * * * *